United States Patent [19]

Yano et al.

[11] Patent Number: 5,762,166
[45] Date of Patent: Jun. 9, 1998

[54] SHIM FOR PREVENTING BRAKE SQUEAL IN A DISK BRAKE

[75] Inventors: Kunihiko Yano, Saitama; Takahiro Niwa, Kanagawa; Seiji Sakurada; Masaki Yoshihara, both of Nara, all of Japan

[73] Assignee: Nichias Corporation, Tokyo, Japan

[21] Appl. No.: 712,775

[22] Filed: Sep. 12, 1996

[30] Foreign Application Priority Data

Mar. 29, 1996 [JP] Japan ................... 8-103414

[51] Int. Cl.$^6$ ............................... F16D 65/38
[52] U.S. Cl. .................. 188/73.37; 188/264 G; 188/250 E
[58] Field of Search ............ 188/73.37, 250 E, 188/264 G, 258, 250 B

[56] References Cited

U.S. PATENT DOCUMENTS

| | | | |
|---|---|---|---|
| 3,918,555 | 11/1975 | Rath | 188/73.37 |
| 4,603,760 | 8/1986 | Myers | 188/73.37 |
| 4,846,312 | 7/1989 | Sweetmore et al. | 188/73.37 X |

FOREIGN PATENT DOCUMENTS

| | | | |
|---|---|---|---|
| 2451392 | 4/1975 | Germany | 188/73.37 |
| 139530 | 10/1980 | Japan | 188/73.37 |
| 203933 | 8/1988 | Japan | 188/264 G |
| 308232 | 12/1988 | Japan | 188/264 G |
| 4-258532 | 9/1992 | Japan | 188/250 E |

*Primary Examiner*—Peter M. Poon
*Attorney, Agent, or Firm*—Flynn, Thiel, Boutell & Tanis, P.C.

[57] ABSTRACT

In order to provide a shim for preventing brake squeal in a disk brake, which can decrease high frequency noise (squealing phenomena) produced at braking, a rubber coated metal, in which a rubber layer is disposed on one surface of a metal plate is used and a pressure sensitive adhesive layer is disposed directly on the other surface of the metal plate, the pressure sensitive adhesive layer may include a primer layer on the other surface of the metal plate. The pressure sensitive adhesive layer of this shim structure serves as an adhesive portion to be stuck to a backplate of a disk brake pad. Since the pressure sensitive adhesive layer is disposed on the metal plate, the pressure sensitive adhesive layer is never peeled off from the rubber coated metal and its damping action (brake squeal preventing action) is maintained.

4 Claims, 5 Drawing Sheets

SHIM FOR PREVENTING BRAKE SQUEAL IN A DISK BRAKE

FIELD OF THE INVENTION

The present invention relates to a shim for preventing brake squeal in a disk brake for an automobile, and in particular to an improvement of a damping shim for reducing high frequency noise (squealing phenomena) produced at braking.

DESCRIPTION OF THE PRIOR ART

Heretofore a shim for preventing brake squeal in a disk brake for an automobile has been fabricated by using a rubber coated metal (hereinbelow abbreviated to RCM), in which thin rubber layers 2, 2 are formed on both the surfaces of a thin metal plate 1 made of an iron plate (cold pressed steel plate), a stainless steel plate, a copper plate, etc., as a starting material, as indicated in FIG. 8; forming a shim structure A, in which a pressure sensitive adhesive layer 3 is disposed on the surface of one of the rubber layers in the starting material; and sticking the shim structure to a backplate 4 in a disk pad consisting of the backplate 4 and a frictional material 5 at the surface of the pressure sensitive adhesive layer 3, as indicated in FIG. 9, to form a restraint type damping structure consisting of RCM—pressure sensitive adhesive layer 3—backplate 4, so that shearing deformation is produced between the backplate 4 and the RCM to obtain a vibration damping action (brake squeal preventing action) by this shearing deformation. In FIG. 9, reference numeral 6 represents a brake piston member.

In the shim structure, age resister and agent for preventing deterioration due to ozone contained in the interior of the rubber layer 2 are segregated and migrate towards the surfaces of the rubber layers (called blooming phenomena) due to heat produced by friction and thrusting force exerted by the piston member, when the disk brake is in operation, which gives rise to a segregated substance layer at the interface between the rubber layer 2 and the pressure sensitive adhesive layer 3. Since the age resister and the agent for preventing deterioration due to ozone (wax component), which have migrated to the interface between the rubber layer and the pressure sensitive adhesive layer in this way, melt at 60° to 75° C., the pressure sensitive adhesive layer is peeled off from the RCM. In such a state, since the pressure sensitive adhesive layer is not restrained between the backplate and the RCM, no shearing deformation takes place and the damping action (brake squeal preventing action) decreases.

SUMMARY OF THE INVENTION

The present invention has been made in order to remove the drawback of the prior art shim structure, in which the pressure sensitive adhesive layer is disposed on the RCM and the main object thereof is to provide a shim for preventing brake squeal in a disk brake, in which no migration of the segregated substance, which lowers strength of the interface between the RCM and the pressure sensitive adhesive layer, takes place and the pressure sensitive adhesive layer is not peeled off from the RCM so that the damping action (brake squeal preventing action) is maintained.

In order to remove the drawback, the present invention is characterized in that an RCM, in which a rubber layer is disposed only on one surface of a metal plate and a pressure sensitive adhesive layer is disposed on the opposite surface of the metal plate, is used to form a shim structure, the pressure sensitive adhesive layer of the shim structure constituting an adhesive portion stuck to a backplate of a disk brake pad.

For disposing the pressure sensitive adhesive layer on the metal plate, there are a method, for coating the metal plate directly with the pressure sensitive adhesive layer and further another method for forming a first primer layer on a surface of the metal plate and thereafter it is coated with the pressure sensitive adhesive layer. In this way it is possible to improve adhesiveness between the metal plate serving as a base plate and the pressure sensitive adhesive layer. They may be suitably selected according to a required performance level.

For the primer layer phenol resin can be cited at first, but resin or coupling agent of epoxy, acryl, etc. can be widely utilized.

By the shim structure thus constructed, the pressure sensitive adhesive layer is never peeled off from the RCM owing to the fact that the pressure sensitive adhesive layer is disposed directly or through the first primer layer on the surface of the metal plate constituting the RCM and is stuck to the backplate, and therefore the damping action (brake squeal preventing action) can be maintained. Here a second primer layer may be disposed also between the metal plate and the rubber layer.

Further the shim structure may be so constructed that a low friction substance layer is disposed on the surface of the rubber layer in the construction according to the present invention.

Graphite, molybdenum bisulfide grease, etc. may be used for the low friction substance layer.

By the shim structure thus constructed it is possible to obtain an effect that the low friction substance layer disposed on the surface of the rubber layer decreases friction between the rubber layer and the brake piston member to intercept vibration causing "brake squeal".

For the pressure sensitive adhesive layer cited, for example, acryl resin or silicone resin can be cited. Further, in order to fabricate a shim for preventing brake squeal in a disk brake comprising the following two methods may be used. That is, one method comprises a step of forming a pressure sensitive adhesive layer by disposing a rubber layer on one surface of a metal plate, coating the other surface of said metal plate with an adhesive solution and drying it, and thereafter heating it in a predetermined period of time, said pressure sensitive adhesive layer serving as an adhesion portion stuck to a backplate of a disk brake pad.

Other method for fabricating a shim for preventing brake squeal in a disk brake comprises a step of forming a pressure sensitive adhesive layer by disposing a rubber layer on one surface of a metal plate, disposing a primer layer on the other surface of said metal plate, coating said primer layer with an adhesive solution and drying it, and thereafter heating it in a predetermined period of time, said pressure sensitive adhesive layer serving as an adhesive portion stuck to a backplate of a disk brake pad.

DESCRIPTION OF THE PREFERRED EMBODIMENTS

Figure 1A:
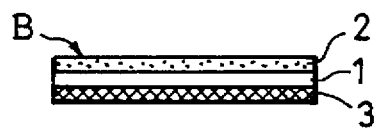
FIGS. 1a and 1b are cross-sectional views of shims for preventing brake squeal in disk brakes, which are two embodiments of the present invention.
Figure 1B:
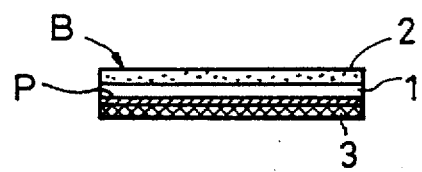
Figure 2:
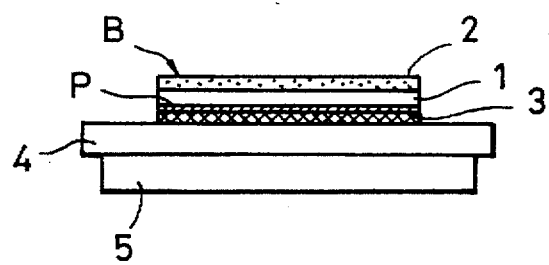
FIG. 2 is a cross-sectional view showing a state, in which the shim indicated in FIG. 1b is mounted on a disk brake pad.
Figure 8:
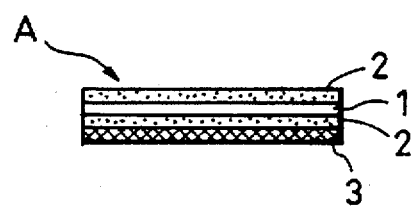
FIG. 8 is a cross-sectional view of a prior art shim for preventing brake squeal in a disk brake.
Figure 9:
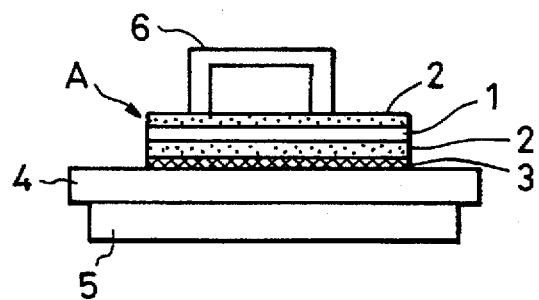
FIG. 9 is a cross-sectional view showing a state, in which the shim indicated in FIG. 8 is mounted on a disk brake pad.

FIGS. 1a, 1b and 2 show two embodiments of the present invention, in which members identical or similar to those indicated in FIGS. 8 and 9 are referred to by same reference numerals.

In FIGS. 1a and 1b, B represents a shim structure, in which reference numeral 1 is a metal plate and 2 is a rubber layer disposed on one surface thereof. On the other surface of the metal plate 1, where there is no rubber layer, a pressure sensitive adhesive layer 3 is disposed directly, as indicated in FIG. 1a, or through a first primer layer P, as indicated in FIG. 1b. For either one of the constituent materials restriction on the thickness is unnecessary. However, in particular in case where it is used as a brake shim, since there is a limitation on the clearance between the pad and the brake piston member, in general following thickness regions are preferable.

For the metal plate 1 it is preferable to use a cold pressed steel plate or a stainless steel plate 0.4 to 0.6 mm thick. A thickness comprised between 20 and 200 μm is used for the rubber layer 2 and a thickness comprised between 50 and 200 μm is used for the pressure sensitive adhesive layer 3 are preferable.

FIG. 2 shows a state, in which the shim structure B indicated in FIG. 1b is stuck to the backplate 4 in the disk pad.

According to the construction of the shim structure B, since the pressure sensitive adhesive layer 3 is stuck directly or through the first primer layer P to the metal plate 1, there is no elution of the substance segregated from the rubber layer, which decreases strength of the interface of the pressure sensitive adhesive layer, as produced by the prior art shim, and therefore the pressure sensitive adhesive layer is never peeled off from the RCM. Consequently the damping action (brake squeal preventing action) is maintained.

Figure 5:
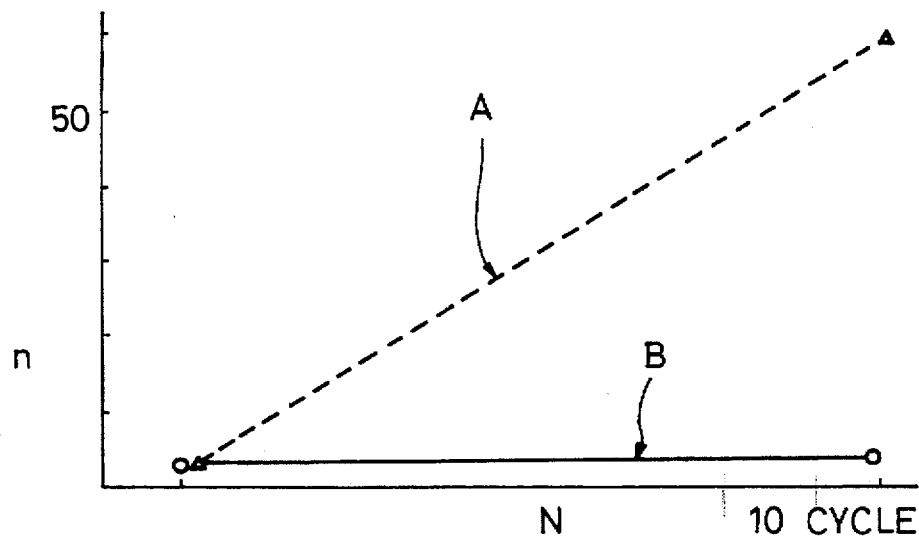
FIG. 5 is a graph indicating variations in the number of brake squeals in a brake squeal dynamo test of a shim structure.

FIG. 5 is a graph representing variations of the number n of brake squeals in function of the number N of braking cycles, when two shims to be tested, which are the prior art shim structure A indicated in FIG. 8 and the shim structure B according to the present invention indicated in FIG. 1, are subjected to a brake squeal dynamo test. This test was effected by using an experimental apparatus for evaluating "brake squeals" produced at stopping a rotating tire by means of a disk brake. It is believed that the number of brake squeals is generally smaller than 3 for 1000 brakings. The test was effected by repeating 10 times a cycle of 270 ; brakings (2700 brakings in total). 3/2700 squeal was detected for the shim structure B according to the present invention, while 60/2700 squeal was detected for the prior art shim structure A.

Figure 6:
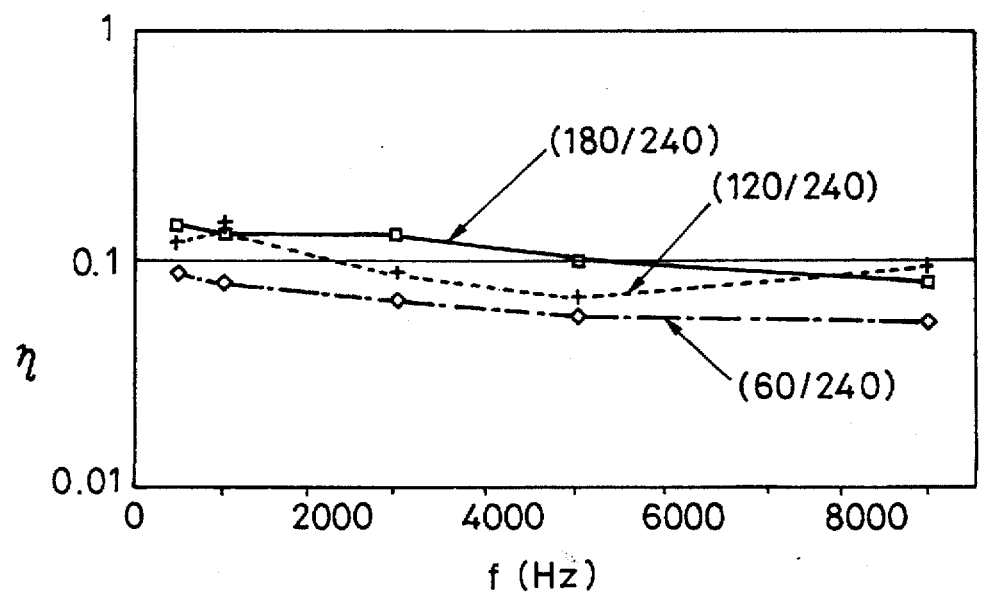
FIG. 6 is a graph showing a relation between length of the adhesion portion of the pressure sensitive adhesive layer and damping property obtained by a beam test.
Figure 7:
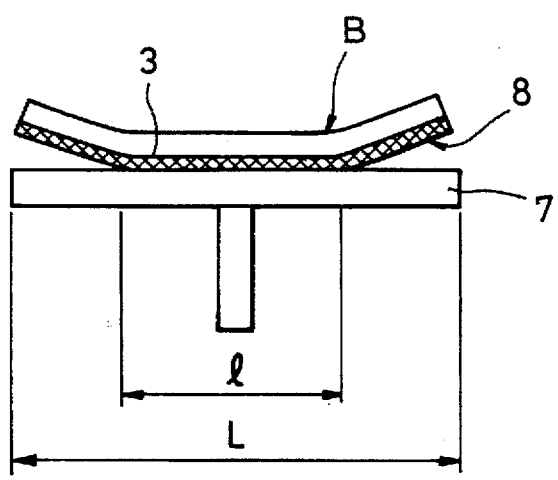
FIG. 7 is a diagram showing the main part of a beam test apparatus.

FIG. 6 is a graph showing a relation between length of the adhesion portion of the pressure sensitive adhesive layer and damping property obtained by a beam test, in which (60/240), (120/240) and (180/240) mean (length l of the adhesion portion/overall length L) and FIG. 7 shows the construction of a beam test apparatus. B represents a shim structure using an RCM (240 mm long and 15 mm wide); 3 is a pressure sensitive adhesive layer; 7 is a beam 3.0 mm thick and 15 mm wide; and 8 is a non-adhesive portion. In case where it is supposed that brake squeals are caused by the bending vibration mode of the brake pad (backplate), when the beam 7 is replaced by a backplate, brake squeal preventing property is equal to attenuating capacity in the beam test.

As indicated by the graph obtained by the beam test in FIG. 6, it was confirmed that the damping property increases with increasing length of the adhesion portion of the pressure sensitive adhesive layer.

This beam test is obtained by reproducing peeling-off of the pressure sensitive adhesive layer in a model and by measuring its attenuating capacity and as a result it can be said that greater peeling-off is produced by smaller length of the adhesion portion. In other words this indicates that better brake squeal preventing results can be obtained by a shim according to the present invention, by means of which a good adhesion state is obtained, even if all the materials are same as those used in the prior art shim. Through FIGS. 5 and 6 it can be seen that one rubber layer in the prior art shim is never efficient.

Figure 3:
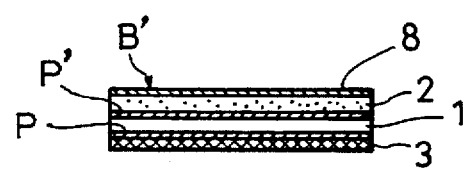
FIG. 3 is a cross-sectional view of a shim for preventing brake squeal in a disk brake, which is another embodiment of the present invention.
Figure 4:
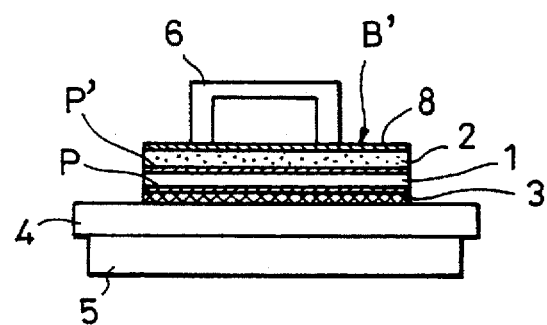
FIG. 4 is a cross-sectional view showing a state, in which the shim indicated in FIG. 3 is mounted on a disk brake pad.

FIGS. 3 and 4 show another embodiment of the present invention and members identical or similar to those indicated in FIGS. 1b and 2 are referred to by same reference numerals.

In FIGS. 3 and 4, B' is a shim structure; 1 is a metal plate; 2 is a rubber layer disposed through a second primer layer P' on one surface of the metal plate 1; 3 is a pressure sensitive adhesive layer stuck through a first primer layer P to another surface of the metal plate 1, where there is no rubber layer, a low friction substance layer 8 made of graphite, molybdenum bisulfide grease, etc.; 4 is a backplate; 5 is a frictional material; and 6 is a brake piston member.

In the construction described above, since a low friction substance layer 8 is disposed on the surface of the rubber layer 2, friction between the rubber layer 2 and the piston member 6 is decreased and an effect can be obtained that vibration causing "brake squeals" is intercepted.

For example, it was confirmed that, for a rubber layer, to which graphite is applied, the static friction coefficient against a clean and flat metal surface is decreased by 30 to 50% with respect to a rubber layer, to which no graphite is applied and that the number of brake squeals is decreased by 5 to 10% in the brake squeal dynamo test.

For fabricating a shim for preventing brake squeal, in which a pressure sensitive adhesive layer is superposed on a metal plate in an RCM, there are known heretofore a method, wherein an adhesive sheet formed previously in the form of a film is transposed on the metal plate and stuck thereto to superpose the adhesive, or a method, wherein an adhesive solution, in which adhesive solved in solvent and bridging agent are mixed, is applied thinly and uniformly to the metal plate and dried so that bridging takes place therein to superpose the pressure sensitive adhesive layer on the metal plate, etc.

However, by the methods described above for superposing the pressure sensitive adhesive layer on the metal plate, superposition is terminated in a state, where bridging degree in the adhesive is saturated at a certain level. Consequently, if the bridging degree in the adhesive is low, since there is a tendency that the adhesive is easily softened at a high temperature and heat resistance decreases, if the pressure sensitive adhesive layer is superposed on the metal plate by a prior art method, the adhesive is softened by heat produced by friction of the disk brake, which gives rise a possibility that the function as a shim for preventing brake squeal is lost. As a general method for increasing the bridging degree in the pressure sensitive adhesive layer, there are known a method, wherein the content of functional groups is increased in the adhesive and further the amount of the bridging agent is increased to be mixed or a method, wherein the bridging mode is changed, etc.

However, in case where the bridging degree in the pressure sensitive adhesive layer is increased by the methods described above, together therewith, influences on other properties of matter, e.g. initial adhesion (tack), damping property, etc., are great and performance required as a shim for preventing brake squeal becomes unsatisfactory.

Therefore at fabricating a shim for preventing brake squeal according to the present invention, it is preferable to use a following method for superposing a pressure sensitive adhesive layer on a metal plate. That is, a method is preferably used, in which it is made possible to increase the bridging density in the adhesive and to improve the heat resistance of the adhesive acting as a shim for preventing brake squeal, by subjecting it to a suitable temperature processing for heating it in a predetermined period of time after having coated the metal plate in the RCM with an adhesive solution obtained by solving an adhesive in an solvent and drying it.

TABLE 1 indicates various properties of matter, when the bridging degree in the adhesive is increased by prior art methods and the method according to the present invention, in which a corresponds to a prior art method, wherein an acrylic base polymer is used for the adhesive and the amount of functional groups and bridging agent is increased; b to a standard method different from one mentioned lastly, and c to the method according to the present invention, wherein the metal plate is subjected to a thermal hysteresis by heating it at a temperature of 120° C. in 10 minutes after having coated it with the adhesive solution and dried it.

TABLE 1

|  | a | b | c |
|---|---|---|---|
| SOFTENING TEMPERATURE (°C.) | 189 | 100 | 192 |
| TACK (g) | 400 | 900 | 870 |

In TABLE 1 the softening temperature is one at which the adhesive is softened by heat, which is used as an index for heat resistance, and the tack is a value of load measured when a probe is pressed to the adhesive with a small pressure and thereafter pulled therefrom, which indicates the initial adhesiveness.

According to TABLE 1 it can be seen that it is possible to superpose a pressure sensitive adhesive layer on a metal plate in an RCM having good properties of matter as a shim preventing brake squeal by heating the adhesive, with which the metal plate is coated, in a predetermined period of time to give it a suitable temperature hysteresis. The temperature for heating is suitably selected in a range between 100°0 C. and 180° C. according to the kind of the adhesive and the period of time for heating is preferably comprised between 5 and 30 minutes. The adhesive solution may be applied directly to the metal plate in the RCM or the method described above may be used after having coated it with a first primer layer.

As described above in detail, according to the present invention, since the shim structure is formed by using an RCM, in which a rubber layer is disposed only on one surface of a metal plate and by disposing a pressure sensitive adhesive layer on the opposite surface of the metal plate, it is possible to obtain a shim for preventing brake squeal in a disk brake, in which a damping action (brake squeal preventing action) is maintained in a long term.

In addition, when the shim is so constructed that a low friction substance layer is disposed on the surface of the rubber layer in the shim structure, which is brought into contact with a brake piston member, it is possible to obtain a shim for preventing brake squeal in a disk brake, which can intercept vibration causing "brake squeal" and decrease the number of brake squeals owing to the vibration intercepting action.

Further, by the method according to the present invention, heat resistance of the pressure sensitive adhesive layer is improved and it is possible to prevent deterioration of the shim for preventing brake squeal due to heat produced by a disk brake and to avoid cost-up by effecting drying of the adhesive and subsequent heat processing thereof.

What is claimed is:

1. A shim for preventing brake squeal, said shim being adapted to be secured to a backplate in a disk brake pad between a pressing member and the brake pad and consisting of:

a metal plate having a first surface and a second surface facing in an opposite direction relative to said first surface;

a rubber layer being disposed on only said first surface, said rubber layer including a segregated substance layer when exposed to heat; and a pressure sensitive adhesive layer directly applied to said second surface, said adhesive layer being adapted to adhere to the backplate of the disk brake pad, whereby said metal plate, positioned between said adhesive layer and said rubber layer, protects said adhesive layer from deterioration due to said segregated substance layer.

2. A shim for preventing brake squeal in a disk brake according to claim 1, wherein said pressure sensitive adhesive layer includes a first primer layer disposed between the second surf ace of said metal plate and an adhesive portion of said pressure sensitive adhesive.

3. A shim for preventing brake squeal in a disk brake according to claim 1, wherein said rubber layer includes a low friction substance layer disposed thereon.

4. A shim for preventing brake squeal in a disk brake according to claim 3, wherein said low friction substance layer is made of at least one of graphite and molybdenum bisulfide grease.

* * * * *